3,152,145
5-ARYL-3,1,4-BENZOXADIAZEPINE-2(1H)-ONES
Theodore S. Sulkowski, Haverford, and Scott J. Childress, Newtown Square, Pa., assignors to American Home Products Corporation, New York, N.Y., a corporation of Delaware
No Drawing. Filed May 23, 1962, Ser. No. 196,881
3 Claims. (Cl. 260—333)

This invention relates to a new class of heterocyclic compounds having valuable pharmacologic effects. The new compounds of this invention may be named as 5-aryl-3,1,4-benzoxadiazepine-2(1H)-ones, and have the structure

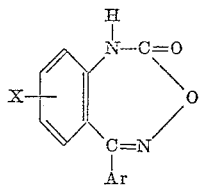

where X is hydrogen, chlorine, bromine, methyl, or trifluoromethyl, and Ar is an aromatic radical selected from the group consisting of phenyl, chlorophenyl, and nitrophenyl.

The new compounds of this invention potentiate the sedative effects of barbiturates and also exhibit anti-inflammatory properties. Thus, administration of from 50 to 200 mg./kg. of the product of Example 1, below, greatly extends the duration of sleep induced by 50 mg./kg. of pentobarbital.

The compounds of this invention may be prepared by the interaction of phosgene and an appropriate 2-aminobenzophenone oxime in the presence of a tertiary base; the chemical reaction occurring may be abbreviated as follows:

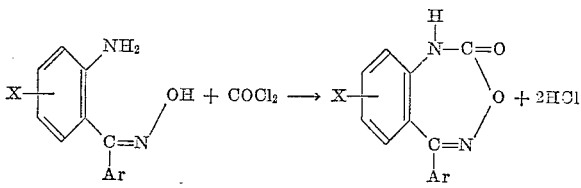

As is well-known, the oximes of unsymmetrical carbonyl compounds can exist in either of two stereoisomeric forms, usually designated as the syn- and anti- or cis and trans forms; for preparing compounds of this invention, the form in which the oxime hydroxyl radical is cis with respect to the aminophenyl radical, is required.

The compounds of this invention may be combined or compounded with suitable diluents, solvents, carriers, fillers, etc., to produce dosage forms suitable for oral or parenteral administration.

The following examples illustrate the practice of this invention.

Example 1

A solution of 12 grams of 2-amino-5-chlorobenzophenone oxime (α-form, hydroxyl cis with respect to substituted phenyl, M.P. 170–173° C.), and 15 ml. of triethylamine in 150 ml. of ethyl acetate is cooled in an ice bath. The solution is stirred vigorously while 40 grams of a 12.5% solution of phosgene in benzene is added dropwise, keeping the temperature below 10° C. After addition is completed, the mixture is stirred for one-half hour at room temperature. The precipitated triethylamine hydrochloride is removed by filtration and the filtrate is concentrated in vacuo to a solid residue of 7-chloro-5-phenyl-3,1,4-benzoxadiazepine - 2(1H)-one. The product may be recrystallized from ethyl acetate to yield colorless crystals. Dissolved in chloroform, the product exhibits U.V. absorption maxima at 245 and 315 mμ; it melts at 195° C., the melt resolidifying and remelting at 312° C.

| Analysis | C | H | N | Cl |
|---|---|---|---|---|
| Calc. for $C_{14}H_9ClN_2O_2$ | 61.66 | 3.33 | 10.27 | 13.00 |
| Found | 61.81 | 3.34 | 10.23 | 12.82 |

Example 2

By the procedure of Example 1, using the syn oxime of 2-amino-5-bromobenzophenone, there is prepared 7-bromo-5-phenyl-3,1,4-benzoxadiazepine-2(1H)-one.

Example 3

By the procedure of Example 1, using the syn oxime of 2-amino-5-methylbenzophenone, there is prepared 7-methyl-5-phenyl-3,1,4-benzoxadiazepine-2(1H)-one.

Example 4

By the procedure of Example 1, using the syn oxime of 2-amino-5-trifluoromethylbenzophenone, there is prepared 7-trifluoromethyl-5-phenyl-3,1,4-benzoxadiazepine-2(1H)-one.

Example 5

By the procedure of Example 1, using the oxime of 2-amino-2',5-dichlorobenzophenone in which the oxime hydroxyl is cis with respect to the amino-substituted phenyl radical, there is produced 7-chloro-5-(o-chlorophenyl)-3,1,4-benzoxadiazepine-2(1H)-one.

Example 6

By the procedure of Example 1, using the oxime of 2-amino-5-chloro-4'-nitrobenzophenone in which the oxime hydroxyl is cis in respect to the amino-substituted phenyl group, there is produced 7-chloro-5-(p-nitrophenyl)-3,1,4-benzoxadiazepine-2(1H)-one.

We claim:

1. A 5-aryl-3,1,4-benzoxadiazepine-2(1H)-one having the formula

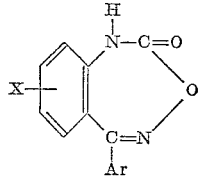

where X is a member of the group consisting of hydrogen, chlorine, bromine, methyl and trifluoromethyl and Ar is a member of the group consisting of phenyl, chlorophenyl and nitrophenyl.

2. 7-chloro-5-phenyl - 3,1,4 - benzoxadiazepine-2(1H)-one.

3. Process which comprises reacting phosgene and a 2-aminobenzophenone oxime having the formula

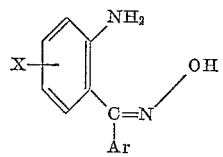

where X is a member of the group consisting of hydrogen, chlorine, bromine, methyl and trifluoromethyl, Ar is a member of the group consisting of phenyl, chlorophenyl and nitrophenyl, and in which the hydroxyl group is in the cis configuration with respect to the amino-substituted phenyl radical in the presence of a tertiary amine base, and recovering a 5-aryl-3,1,4-benzoxadiazepine-2(1H)-one.

No references cited.